United States Patent
Kennedy et al.

(10) Patent No.: US 6,727,321 B1
(45) Date of Patent: Apr. 27, 2004

(54) ALLYLATION POLY(VINYL CHLORIDE) AND FURTHER FUNCTIONALIZATION OF ALLYL GROUPS

(75) Inventors: Joseph P. Kennedy, Akron, OH (US); Zhengjie Pi, Akron, OH (US)

(73) Assignee: University of Akron, Akron, OH (US)

( * ) Notice: Subject to any disclaimer, the term of this patent is extended or adjusted under 35 U.S.C. 154(b) by 0 days.

(21) Appl. No.: 09/604,309

(22) Filed: Jun. 27, 2000

(51) Int. Cl.$^7$ ............................................. C08F 259/04
(52) U.S. Cl. ........................ 525/244; 525/288; 525/313; 525/326.5; 526/338; 526/345
(58) Field of Search .................................. 526/338, 345; 525/244, 313, 288, 326.5

(56) References Cited

U.S. PATENT DOCUMENTS

| | | | |
|---|---|---|---|
| 2,384,975 A | | 9/1945 | Sparks et al. |
| 2,612,493 A | | 9/1952 | Sparks et al. |
| 3,291,782 A | | 12/1966 | Anderson et al. |
| 3,296,230 A | | 1/1967 | Gateff et al. |
| 3,330,886 A | * | 7/1967 | Riou et al. |
| 3,435,020 A | | 3/1969 | Olson |
| 3,472,830 A | | 10/1969 | Baxter et al. |
| 3,804,919 A | | 4/1974 | Schrage et al. |
| 3,896,091 A | | 7/1975 | Fabris et al. |
| 4,032,594 A | | 6/1977 | Serratore et al. |
| 4,049,747 A | * | 9/1977 | Jin et al. |
| 4,363,903 A | | 12/1982 | Yamane et al. |
| 4,605,704 A | | 8/1986 | Eastman et al. |
| 5,104,956 A | | 4/1992 | Waymouth |
| 5,208,304 A | | 5/1993 | Waymouth |
| 5,260,389 A | | 11/1993 | Resconi et al. |
| 5,387,664 A | | 2/1995 | Kawasaki et al. |
| 5,578,743 A | | 11/1996 | Ho et al. |
| 6,143,848 A | * | 11/2000 | Lee et al. |

FOREIGN PATENT DOCUMENTS

EP 0 507 468 10/1992

OTHER PUBLICATIONS

Ivan et al., CAPLUS AN 1982:69567.*
Thermal Stability of Graft Modifications of PVC and Related Materials, Abbås et al., *Journal of Polymer Science*, Polymer Chemistry Edition, vol. 13, (1975), pp. 59–68, John Wiley & Sons, Inc.
Encyclopedia of PVC, vol. 1, 2$^{nd}$ Ed., Marcel Dekker, Inc. New York, (1986); pp. 570–605.
*Heat Degradation of PVC Stabilized by Treatment with Alkylaluminum Compounds,* Gupta and Kennedy, *Makromol.Sci.–Chem.*, A12(10), (1978) pp. 1407–1426.
*The Discoloration of PVC–I, Correlation Between the Dehydrochlorination and Discoloration of PVC,* Levai and Ocskay, *European Polymer Journal,* vol. 10, Pergamon Press (1974), pp. 1121–1125.

*Living Carbocationic Polymerization. XXX. One–Pot Synthesis of Allyl–Terminated Linear and Tri–Arm Star Polyisobutylenes, and Epoxy– and Hydroxy–Telechelics Therefrom,* Ivan and Kennedy, *Journal of Polymer Science:* Part A: Polymer Chemistry, vol. 28, (1990), pp. 89–104.

*Determination of Tertiary Chlorine Structures in PVC,* Buruiană, Airinei, Robilă and Caraculacu, *Polymer Bulletin* 3, (1980), pp. 267–271.

*Graft Modification of PVC and Related Reactions,* Thame and Lundberg, *Journal of Polymer Science:* Part A–1, vol. 10, (1972), pp. 2507–2525.

*Determination of Unsaturated Structures in PVC by Means of Fourier Transform $^1$H–NMR Spectroscopy,* Caraculacu and Bezdadea, *Journal of Polymer Science:* Polymer Chemistry Edition, vol. 15, (1977), pp. 611–620.

*Determination of Labile Chlorine in PVC with the Aid of Phenolysis Reaction,* Buruiană, Robilă and Caraculacu, *European Polymer Journal,* vol. 13, (1977) pp. 21–24, Pergamon Press.

*New Approaches to the Study of Labile Structures in PVC by Phenolysis,* Muangos, Martines, and Millán, *European Polymer Journal,* vol. 18, (1982), pp. 731–734, Pergamon Press.

*New Telechelic Polymers and Sequential Copolymers by Polyfunctional Initiator–Transfer Agents (Inifers). III. Synthesis and Characterization of a Poly(α–Methylstyrene–b–Isobutylene–b–α–Methylstyrene),* Kennedy and Smith, *Journal of Polymer Science:* Polymer Chemistry Edition, vol. 18, 1539–1546 (1980).

*New Telechelic Polymers and Sequential Copolymers by Polyfunctional Initiator–Transfer Agents (Inifers). XVII. Epoxy and Aldehyde Telechelic Polyisobutylenes,* Kennedy, Chang, and Francik, *Journal of Polymer Science:* Polymer Chemistry Edition, vol. 20, 2809–2817 (1982).

*Thermal Stability of Graft Modifications of PVC and Related Materials,* Abbas, *Journal of Polymer Science:* Polymer Chemistry Edition, vol. 13, 59–68 (1975).

*Cationic Grafting: The Synthesis, Characterization and Physical Properties of Poly (Vinyl Chloride–g–Isobutylene),* Kennedy and Davidson, Polymer Prepr., Am. Chem. Soc., Div. Polymer Chem., (1974) 15, 209–213.

(List continued on next page.)

Primary Examiner—Jeffrey Mullis
(74) Attorney, Agent, or Firm—Hudak, Shunk & Farine, Co. LPA

(57) ABSTRACT

The preparation of allylated poly(vinyl chloride) by utilizing an allyltrialkylsilane in the presence of Friedel-Crafts acids is disclosed. The pendant allyl groups can be further reacted through various functionalization reactions to contain end groups such as epoxy. A method for determination of the labile chlorine content of poly(vinyl chloride) is also disclosed.

10 Claims, 2 Drawing Sheets

OTHER PUBLICATIONS

*Poly(vinyl Chloride–g–Butyl Rubber)*, Kennedy and Davidson, *Journal of Polymer Science:* Polymer Chemistry Edition, vol. 14. 153–157 (1976).

*Cationic Polymerization of Isobutylene from Poly (vinyl Chloride): Physical Properties of Poly(vinyl Chloride–g–Isobutylene)*, Kennedy and Davidson, *Journal of Applied Polymer Science:* Applied Polymer Symposium 30, 51–72 (1977).

*Cationic Polymerization of Isobutylene from Poly (vinyl Chloride): Physical Properties of Poly(vinyl Chloride–g–Isobutylene)*, Kennedy and Davidson, *Journal of Applied Polymer Science:* Applied Polymer Symposium 30, 13–49 (1977).

*Mechanism and Microstructure in the Free–Radical Polymerization of vinyl Chloride: Head to Head Addition Revisited,* Starnes and Wojciechowski, *Makromol. Chem. Macromol. Symp.* 70/71, 1–11 (1993).

*New Structural and Mechanistic Chemistry in Polymerizations of Vinyl Chloride Initiated by Di–tert–alkylmagnesiums,* Benedikt et al., *Macromolecules,* 30, (1997), 10–21.

*Intramolecular Hydrogen Transfers in Vinyl Chloride Polymerization: Routes to Doubly Branched Structures and Internal Double Bonds,* Starnes et al., *Macromolecules,* (1998) 31, 1508–1517.

*Thermal Degradation of some Model Compounds for Polyvinylchloride,* Airinei et al., *Polymer Bulletin,* (Berlin) (1982), 7, 465–471.

*Formation of Anomalous Structures in PVC and Their Influence on the Thermal Stability: 2. Branch Structures and Tertiary Chlorine,* Hjertberg and Sorvik, *Polymer,* (1983), 24, Jun., 673–684.

*Poly(Vinyl Chloride–g–Styrene): Synthesis, Characterization, and Physical Properties,* Kennedy and Nakao, *Journal of Macromol. Sci.–Chem.,* A12(2), pp. 197–207 (1978).

*Structural Defects in Polyvinylchloride–I, Internal Unsaturation as Initiation Sites for Dehydrochlorination,* Braun, Michel and Sonderhof, *European Polymer Journal,* vol. 17, pp. 49–56, (1981), Pergamon Press,.

*Monte Carlo Simulation of the Formation of Irregular Structures in Poly (vinyl chloride),* Guyot, *Macromolecules,* (1986), 19, 1090–1096.

*Unsaturated End Groups in PVC–III,* Bezdadea, Buruiana and Carculacu, *European Polymer Journal,* (1971), vol. 7, pp. 1649–1660, Pergamon Press.

*On the Mechanism of the Polymerization of Poly(vinyl chloride),* Caraculacu, Buruiana and Robila, *Journal of Polymer Science:* Polymer Chemistry Edition, vol. 16, 2741–2745 (1978).

*Working Party on Defects in the Molecular Structure of PVC and Their Relation to Thermal Stability: General Conclusions,* Guyot, *Journal of Vinyl Technology,* (1985), 7(2), 92–94.

*Effects of Stabilizers During the Thermal Treatment of PVC. II. Correlation of Thermal Stability, Discoloration, and Stabilizer Exhaustion,* Czako, *Plasty Kauc.,* (1975), 12(9), 259–261 (Scifinder Abstract only).

*Investigation of Thermal Degradation of PVC in the Solid State,* Levai, Ocskay, Szebeni, *Journal Macromol. Sci., Chem* (1978), A12(3), 467–477 (Scifinder Abstract only).

*Colorimetric Characterization of the Discoloration of Thermally Treated PVC,* Thielert, Schliemann, Figge, Agnew, *Makromol. Chem.* (1975), 47(1), 129–40 (Scifinder Abstract only).

*Formation of Anomalous Structures in PVC and Their Influence on Thermal Stability–I, Endgroup Structures and Labile Chlorine Substituted by Phenol,* Hjertberg and Soervik, *Journal Macromol. Sci., Chem.,* (1982), A17(6), 983–1004 (Scifinder Abstract only).

* cited by examiner

ALLYLATION POLY(VINYL CHLORIDE) AND FURTHER FUNCTIONALIZATION OF ALLYL GROUPS

FIELD OF THE INVENTION

The present invention relates to the preparation of allylated poly(vinyl chloride) by utilizing an allyltrialkylsilane in the presence of Friedel-Crafts acids. The pendant allyl groups can be further reacted through various functionalization reactions to contain groups such as epoxy. A method for determination of the labile chlorine content of poly(vinyl chloride) is also disclosed.

BACKGROUND OF THE INVENTION

During polymerization of vinyl chloride to poly(vinyl chloride) (PVC), in addition to regular —$CH_2CH(Cl)$— repeat units, a very small quantity of "active" or "labile" chlorines also arises. Although the concentration of these active chlorines is very modest, their presence decisively influences the ultimate thermal, oxidative, and chemical stability of this commercially important resin. The literature is replete with references addressing details of this problem such as set forth in Thermal Degradation of Some Model Compounds for Poly(vinyl chloride), Airinei, Buruiana, Robila, Vasile and Caraculacu, Polymer Bulletin 7, 465–471, (1982); Formation of Anomalous Structures in PVC and Their Influence on the Thermal Stability:1 End-group structures and Labile Chlorine Substituted by Phenol, Hjertberg, Soervik, *J. Macromol. Sci., Chem.* 1982 A17(6), 983–1004; and Formation of Anomalous Structures in PVC and Their Influence on the Thermal Stability:2. Branch Structures and Tertiary Chlorine, Hjertberg and Sorvik, Polymer, Vol. 24, June, 1983, pp. 673–684.

It has been found that the active chlorines in poly(vinyl chloride), in conjunction with certain Friedel-Crafts coinitiators, are efficient initiators for the grafting of cationically active monomers (isobutylene, styrene) from poly (vinyl chloride), and that the thermal stability of the grafted poly(vinyl chloride) increases significantly over that of unmodified poly(vinyl chloride). See for example Cationic Grafting: The Synthesis, Characterization and Physical Properties of Poly (Vinyl Chloride-g-isobutylene), Kennedy and Davidson, *J. Macromol. Sci. Chem.*, A12(2), pp. 197–207 (1978); Poly(vinyl chloride-g-Styrene): Synthesis, Characterization, and Physical Properties, Kennedy and Nakao, *J. Macromol. Sci.-Chem.*, A12(2), pp 197–207 (1978); Thermal Stability of Graft Modifications of PVC and Related Materials, Abbas, *Journal of Polymer Science*: Polymer Chemistry Edition, Vol. 13, 59–68 (1975); New Telechelic Polymers and Sequential Copolymers by Polyfunctional Initiator-Transfer Agents (Inifers). XVII. Epoxy and Aldehyde Telechelic Polyisobutylenes, Kennedy, Chang, and Francik, *Journal of Polymer Science*: Polymer Chemistry Edition, Vol. 20, 2809–2817 (1982); and New Telechelic Polymers and Sequential Copolymers by Polyfunctional Initiator-Transfer Agents (Inifers). III. Synthesis and Characterization of a Poly($\alpha$-Methylstyrene-b-isobutylene-b-$\alpha$-Methylstyrene), Kennedy and Smith, *Journal of Polymer Science*: Polymer Chemistry Edition, Vol. 18, 1539–1546 (1980).

The active chlorine content in poly(vinyl chloride) has been determined by several groups by using FTIR and UV spectroscopy, and selective reactions in conjunction with IR- or UV- active reagents. The values reported in the literature cover quite a broad range (i.e. anywhere from 0.04 to 2.3 mol %), and the discrepancy cannot be explained only by the differences between the samples used. This uncertainty prompted us to develop an analytical method for the determination of the minute concentrations of active chlorines in poly(vinyl chloride) starting material.

SUMMARY OF THE INVENTION

The preparation of the allylated poly(vinyl chloride) is described herein. The active chlorines in poly(vinyl chloride) can be replaced by pendant allyl groups (—$CH_2CH=CH_2$) by the use of allyltrialkylsilane in the presence of Friedel-Crafts acids. The thermal stability of allylated poly(vinyl chloride) is significantly superior to that of the starting material. NMR analytical results of the allylated poly(vinyl chloride) can be utilized to determine the active chlorine content in poly(vinyl chloride). The allyl groups of the allylated poly(vinyl chloride) can be used in various functionalization reactions such as epoxidation, hydroboration, and hydrosilation.

DETAILED DESCRIPTION OF THE INVENTION

Figure 1:
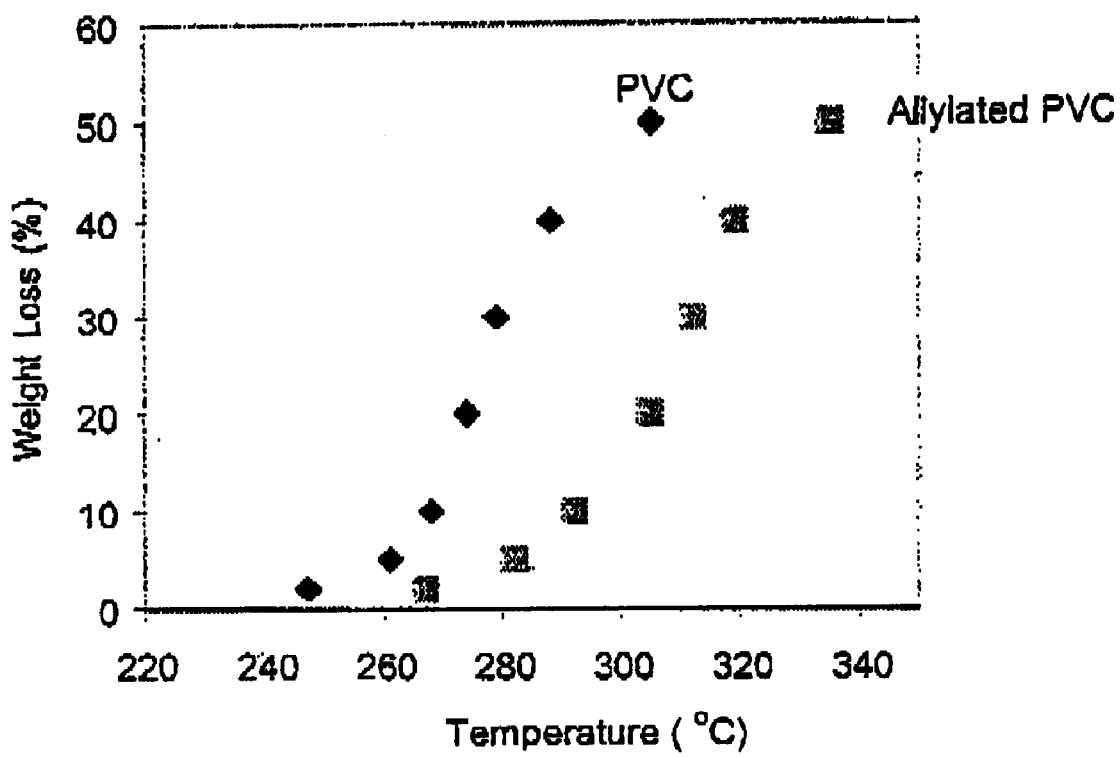
FIG. 1 is a gravimetric analysis of an allylated pvc(10° C./min under nitrogen).
Figure 2:
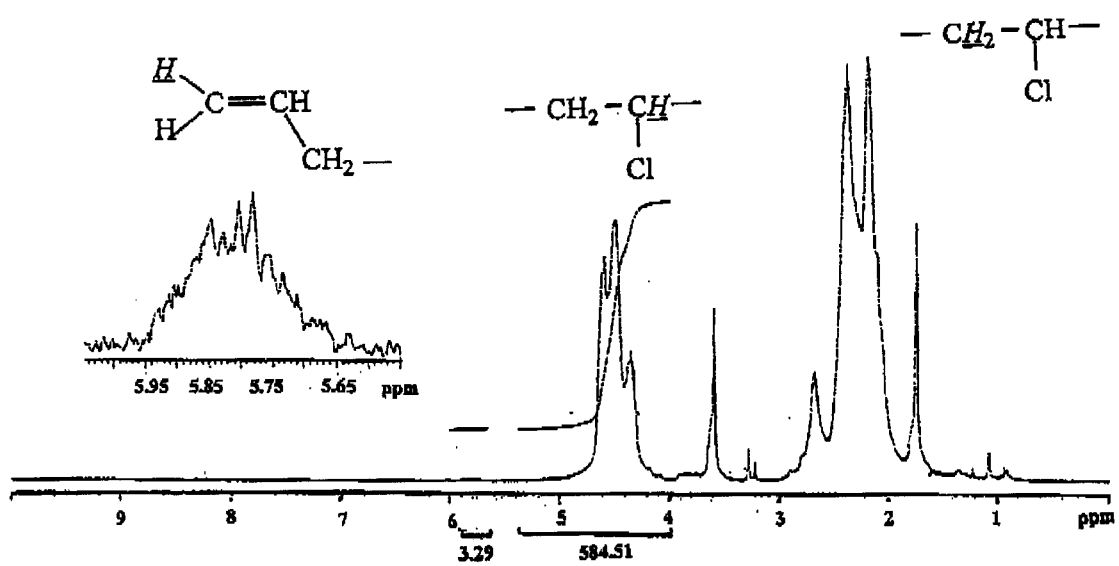
FIG. 2 is an $^1H$ NMR spectrum of a representative allylated poly(vinyl chloride) obtained with $TiCl_4$.

The poly(vinyl chloride) utilized by the present invention is well known to the art and to the literature. The polymerization of vinyl chloride monomer to poly(vinyl chloride) in addition to the regular —$CH_2CH(Cl)$— repeat units, also inherently results in the presence of a very small quantity of active or labile chlorines. The presence of labile chlorines influence the thermal, oxidative, and chemical stability of the poly(vinyl chloride) resin. The labile chlorines in poly (vinyl chloride) can be substituted with allyl groups as described hereinbelow by the use of allyltrialkylsilane in the presence of Friedel-Crafts acids.

The poly(vinyl chloride) polymer or resin as utilized in this invention is preferably a homopolymer of vinyl chloride. In addition, small amounts of a copolymer derived from comonomers may be utilized in conjunction with the vinyl chloride monomers in preparing the polymer. Some preferred commoners include, but are not limited to, vinyl acetate, cc-methylvinyl chloride, vinylsterate, vinylbenzoate, vinylidene chloride, and vinyl bromide, acrylonitrile, acrylates and methacrylates, or combinations thereof. When a comonomer is utilized with the poly(vinyl chloride) of the present invention, the comonomer ranges generally from about 0.01 to about 10 or 20 parts by weight, desirably from about 0.05 to about 5 parts by weight, and preferably from about 0.5 to about 3 parts by weight based upon the total weight of the comonomer and poly(vinyl chloride). The present invention also extends and pertains to chlorinated poly(vinyl chloride) i.e., C-PVC. The preparation of C-PVC is well known to the art and to the literature. C-PVC can be utilized in place of the homopolymer of vinyl chloride, or blended therewith, or copolymerized with the comonomers as stated above.

Hereinafter, poly(vinyl chloride) refers to either a homopolymer of vinyl chloride, or copolymers of vinyl chloride, or a blend thereof with C-PVC.

The poly(vinyl chloride) polymers or copolymers utilized by the present invention are widely available commercially from such sources as the Geon Company as Geon® Resin 110×377. The poly(vinyl chloride) can be used in its purchased state or can also be purified before use, such as by precipitation from THF into excess methanol, which is then dried, as in a vacuum oven at room temperature, before use.

The allylation of poly(vinyl chloride) should be carried out in a reaction vessel fitted with a stirrer or other agitating means and heating and/or cooling means. Preferably, the allylation is conducted in the presence of an inert gas such as nitrogen, helium, argon, neon, and the like, in order to allylate under controlled, inert or non-reactive conditions.

Desirably, the poly(vinyl chloride) is placed into solution by using appropriate polar solvents containing a total of from 1 to 6 or 12 carbon atoms, such as 1,2-dichloroethane, methylene chloride, methyl chloride, chlorobenzene, dichlorobenzene, and vinyl chloride, or combinations thereof. Preferred solvents include methylene chloride, and methyl chloride. Enough solvent is utilized so that poly(vinyl chloride) is present in solution in an amount generally from about 0.5 to about 5.0, desirably from about 0.6 to about 3.0, and preferably from 0.75 to about 1.25 percent by weight based on the total weight of poly(vinyl chloride) and solvent.

The solution of poly(vinyl chloride) is cooled in the reactor vessel. Suitable temperatures generally range from about minus 20° C. to about minus 90° C., desirably from about minus 30° C. to about minus 80° C., and preferably from about minus 50° C. to about minus 70° C.

Once cooled, allyltrialkylsilane is added to the solution. Allyltrialkylsilane generally has the formula:

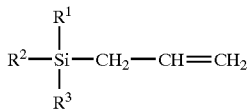

wherein $R^1$, $R^2$, and $R^3$, independently, are alkyls (linear or branched) having from 1 to about 5 carbon atoms. $R^1$, $R^2$, and $R^3$ are preferably methyl groups and hence, the preferred allyltrialkylsilane is allyltrimethylsilane (ATMS).

Allyltrialkylsilane is utilized in an amount generally from about 0.01 to about 10 moles and preferably from about 0.05 to about 5 moles per liter of solution.

Alternatively, a substituted allyltrialkylsilane can be used in place of the allyltrialkylsilane or in combination therewith. The substituted allyltrialkylsilane generally has the formula

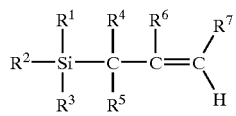

wherein $R^1$, $R^2$, and $R^3$, independently, is an alkyl (linear or branched) having from 1 to about 5 carbon atoms, wherein $R^4$, $R^5$, $R^6$, and $R^7$, independently, can be hydrogen atoms, an alkyl (linear or branched) having from 1 to 10 carbon atoms. The substituted allyltrialkylsilanes can be utilized in the amounts stated above for the allyltrialkylsilanes.

One or more Friedel-Crafts acids are also added to the solution. Such Friedel-Crafts acids include, but are not limited to, titanium tetrachloride, diethyl aluminum chloride, boron trichloride, ethyl aluminum dichloride, tin tetrachloride, aluminum trialkyl, wherein each alkyl, independently, has from 1 to 6 carbon atoms, and the like. The amount of Friedel-Crafts acid utilized generally is from about $1 \times 10^{-3}$ to about $8 \times 10^{-3}$ moles per liter, desirably from about $3 \times 10^{-3}$ to about $6 \times 10^{-3}$ moles per liter, and preferably from about $4 \times 10^{-3}$ to about $5 \times 10^{-3}$ moles per liter of solution.

The reaction solution is mixed and allowed to proceed generally from about 5 minutes to about 60 minutes, desirably from about 10 minutes to about 45 minutes, and preferably from about 15 minutes to about 30 minutes, thus forming the allylated poly(vinyl chloride) of the present invention. The reaction is then terminated with an alcohol having from 1 to 5 carbon atoms or an amine utilizing an excess to precipitate the allylated poly(vinyl chloride). Suitable alcohols include methanol, ethanol, and propanol. Methanol and ethanol are preferred.

The solution is then evaporated, leaving the allylated poly(vinyl chloride). If desired, the allylated poly(vinyl chloride) can be purified by re-dissolving in tetrahydrofuran, cyclohexanone, or any other suitable poly(vinyl chloride) solvent, and centrifuged for any desirable amount of time, such as approximately one hour, to remove residues such as small amounts of metal oxide.

While not being bound by theory, it is believed that the mechanism of the reaction is as follows:

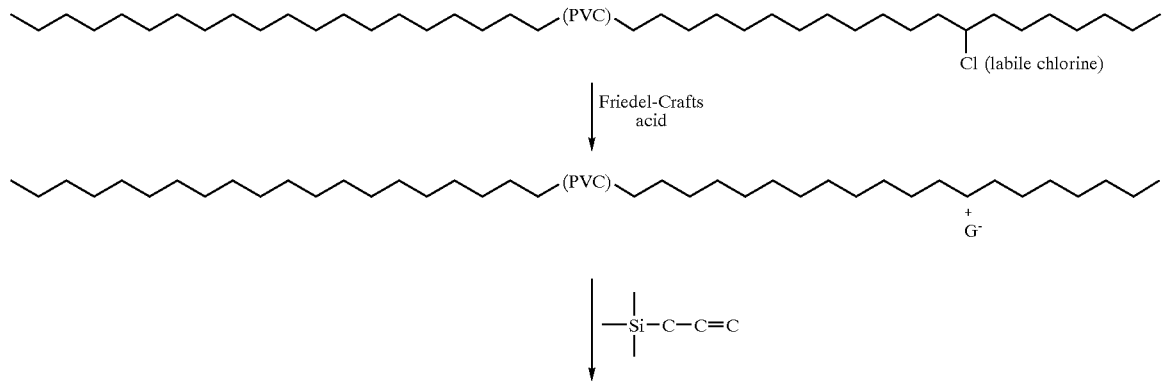

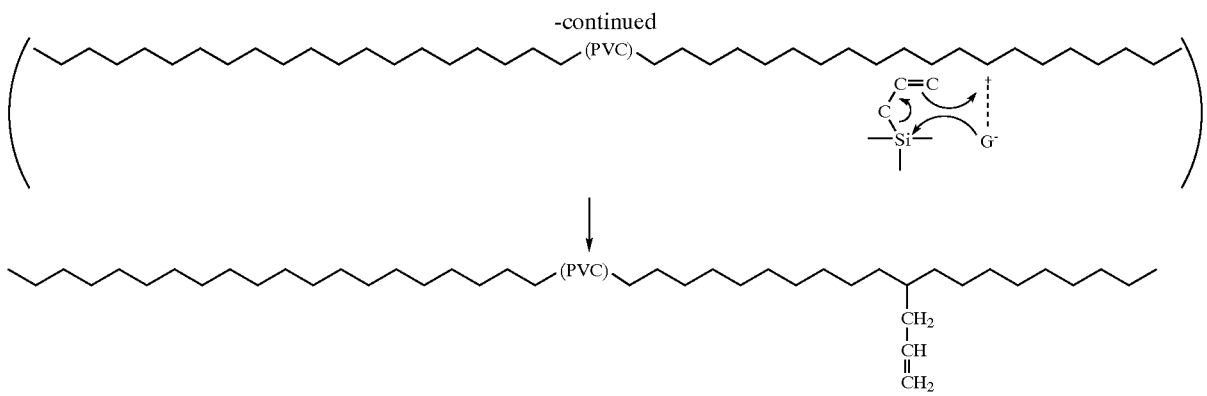

wherein G is $TiCl_5^-$, $Et_2AlCl_2^-$, $BCl_4^-$, or $SnCl_5^-$.

NMR spectroscopy was used to confirm the structure of the allylated poly(vinyl chloride), with the allylated portion having the formula

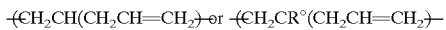

wherein R° is a poly(vinyl chloride) chain branch. The allyl groups are incorporated onto the Geon 110×377 polymer in an average amount from about 1.6 to about 1.8 groups per polymer chain. Generally, allyl groups can be incorporated onto poly(vinyl chloride) polymers or copolymers in an average amount generally from about 1.0 to about 3.0, desirably from about 1.3 to about 2.5, and preferably from about 1.4 to about 2.0 groups per polymer chain. The degree of polymerization of the poly(vinyl chloride) ranges generally from 100 to about 1,500 or greater, desirably from about 150 to about 1,000, and preferably from about 200 to about 900 number average.

The presence of an allyl group on the poly(vinyl chloride), derived from reacting the labile chlorines thereon, adds significantly to the thermal stability of the poly(vinyl chloride) chain and also permits various functional groups to be added to the poly(vinyl chloride), thus permitting the grafting of additional compounds thereon, such as other polymers and the like.

Accordingly, the allylated poly(vinyl chloride) compositions of the present invention can also be classified as a reactive poly(vinyl chloride) intermediate that can be further functionalized through the allyl groups utilizing reactions such as epoxidation, hydroboration, and hydrosilylation.

Epoxidation of allylated poly(vinyl chloride) can be accomplished as follows. A desired amount of allylated poly(vinyl chloride) is dissolved by any of the solvents as noted hereinabove. Enough solvent is utilized so that poly (vinyl chloride) is present in solution in an amount generally from about 0.1 to about 10, desirably from about 0.5 to about 5, and preferably from about 1 to about 2 percent by weight based on the total weight of poly(vinyl chloride) and solvent. A peracid, i.e., a molecule comprising a —COOOH group, such as m-chloroperbenzoic acid, peracetic acid, perpropionic acid, trichloroperacetic acid, trifluoroperacetic acid, or a combination thereof, is then added to the allylated poly (vinyl chloride) solution. Preferred peracids are m-chloroperbenzoic acid and peracetic acid. The peracid is added in amounts from about 2 to about 10 times in excess of stoichiometric ratio of the allylated poly(vinyl chloride). The reaction is carried out under normal atmospheric conditions. The reaction temperature may be generally from about −20° C. to about 80° C., desirably from about −10° C. to about 50° C., and preferably the reaction is run at ambient room temperature, i.e., from about 10 to about 30° C. The reaction is allowed to proceed while preferably stirred, generally for about 10 minutes to about 4 hours, desirably from about 20 minutes to 1 hour, and preferably for about 0.5 hours.

The product is precipitated with an alcohol having from about 1 to about 5 carbon atoms, such as methanol. The precipitated product can be washed sequentially with 5% aqueous sodium bicarbonate, distilled water and methanol. The solvent is evaporated and the product is dried, such as in a vacuum oven, at room temperature.

While not being limited to theory, an overall reaction mechanism is as follows:

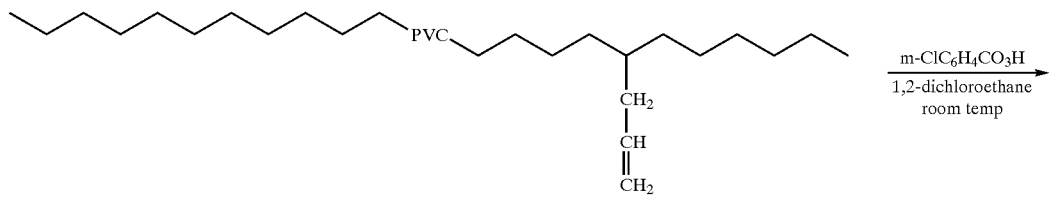

-continued

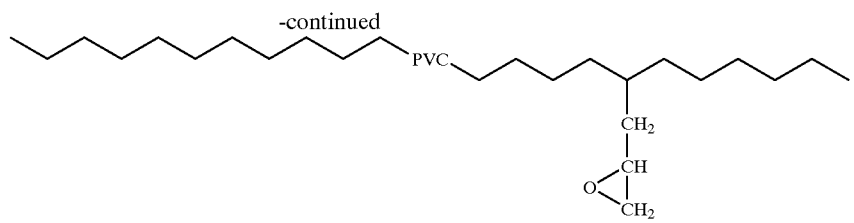

The structure of the epoxidized poly(vinyl chloride) was investigated by $^1$H NMR spectroscopy. However, the, characteristic resonances of the pendant propylene oxide group could not be identified because of the overlap of the epoxy methylene protons with the various protons in poly(vinyl chloride). The complete disappearance of the olefin resonances in the range of the allyl group (5.65 to 5.95 ppm), together with the characteristic $^{13}$C NMR resonances, however, indicates essentially quantitative epoxidation.

Generally, by, utilizing a similar process, hydroborated or hydrosilated poly(vinyl chloride) can be formed, generally having the following structures respectively:

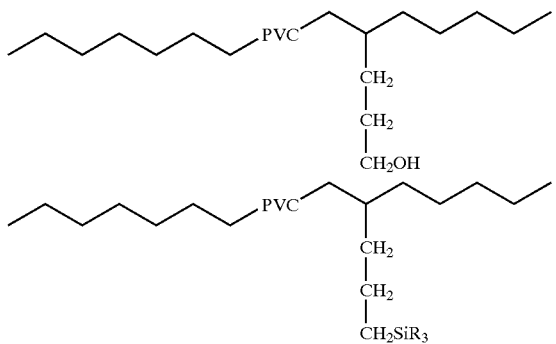

wherein each R, independently, is an alkyl (linear or branched) or a substituted alkyl having from 1 to about 10 carbon atoms.

In a further embodiment of the present invention, an analytical method for determining the active chlorine content in poly(vinyl chloride) is disclosed.

Poly(vinyl chloride) contains, in addition to "normal" secondary chlorines, labile allylic and/or tertiary chlorines as well. The thermal instability of poly(vinyl chloride) is due: to the presence of a small but critical amount of labile chlorine with end-allylic structure (I), internal-allylic structure (II), and tertiary structure (III) wherein R° is a poly (vinyl chloride) chain branch. It is the labile chlorine that provides active sites for the above-noted allylation.

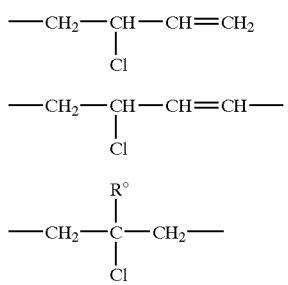

The quantitative method utilizes the above described allyl group replacement of the active chlorines of poly(vinyl chloride). The method makes use of the reaction between allyltrialkylsilane and cationic species generated from cationically active chlorines by a Friedel-Crafts acid. The driving force of this substitution is the high chlorine affinity of silicone to the counter anion formed with the Friedel-Crafts acid.

By utilizing the above described allylation method, the allyl group content, and, consequently the cationically active chlorine content in poly(vinyl chloride), can be quantitatively determined by NMR spectroscopy, more specifically $^1$H NMR spectroscopy.

$^1$H NMR spectroscopy is carried out on the allylated poly(vinyl chloride). The characteristic resonances of the allyl function, i.e., the terminal protons in the —CH$_2$—CH═CH$_2$ groups, which are generally found in the 5.65 to 5.95 ppm range, are integrated and correlated with the resonances of the C—H group, which are generally found around 4.5 ppm, to give the amount of allyl group content, and thus also the active chlorine content.

In order to find the actual amount of active chlorines per poly(vinyl chloride) chain, the amount of allyl chloride content per chain in the virgin (pre-allylated) poly(vinyl chloride) polymer must be measured by NMR, spectroscopy and subtracted from the number of allyl groups per chain measured from the allyated poly(vinyl chloride) polymer. This is generally because poly(vinyl chloride) always contains a variety of "abnormal" structures, for example:

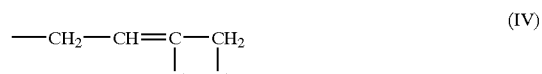

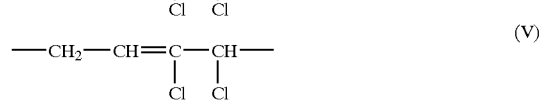

The characteristic $^1$H NMR resonances of these allyl chlorine structures are in the same range as those of the allyl function of the present invention. The reactive C—Cl bonds in these structures can be replaced with relatively stable C—C bonds by allylation, but the chemical shifts of the resonances will appear in the same range. The position of these abnormal allyl resonances remains constant and will not affect the determination of active chlorines. The abnormal structures contribute generally about 1.5 allyl groups in poly(vinyl chloride) in the Geon 110×377 poly(vinyl chloride). The cationically active chlorines in mol % is obtained by dividing the number of active chlorines per poly(vinyl chloride) with the number average degree of polymerization of the poly(vinyl chloride) used, i.e., 585 with the Geon 110×377 resin utilized. The cationically active chlorine content of the Geon resin determined by our method was 0.27% to 0.31 mol % of the total chlorine content, which is equivalent to about 1.6 to about 1.8 cationically active chlorines per poly(vinyl chloride) chain.

The thermal stability and extent of discoloration of heated films was studied in order to show allylated poly(vinyl chloride) offers improved thermal properties over virgin poly(vinyl chloride).

Heating of poly(vinyl chloride) invariably-leads to discoloration and the extent of discoloration is a sensitive measure of the extent of thermal degradation of the resin. The thermal instability of poly(vinyl chloride) is due to the presence of active chlorines, predominantly tertiary and allylic chlorines, and the replacement of these with relatively more stable C—C bonds leads to improved thermal properties.

TABLE 1

Comparison of thermal stability of virgin poly(vinyl chloride) and allylated poly(vinyl chloride):

| | Temperature (° C.) at % Weight loss (in air by TGA) | | | | | | |
|---|---|---|---|---|---|---|---|
| | 2% | 5% | 10% | 20% | 30% | 40% | 50% |
| POLY(VINYL CHLORIDE) | 247 | 261 | 268 | 274 | 279 | 288 | 305 |
| Allylated PVC | 262 | 276 | 290 | 302 | 310 | 318 | 332 |

The thermal stability of allylated poly(vinyl chloride) was studied by thermal gravimetric analysis (TGA) in air and $N_2$. TABLE I lists representative thermal stability data. The thermal stability of allylated poly(vinyl chloride) as measured by weight loss was improved by about 15° C. at low weight loss, and by more than 30° C. at about 20 to about 30 percent weight loss. Dehydrochlorination is more rapid in the presence of oxygen. Indeed, the thermal stability of allylated poly(vinyl chloride) is much higher in $N_2$ as illustrated by the data in FIG. 1.

In allylated poly(vinyl chloride), the active chlorines are replaced by the more stable C—C bonds.

EXAMPLES

The following examples serve to illustrate, but not to limit, the present invention.

Allylated PVC. Allylation of poly(vinyl chloride) was carried out in a stainless steel dry box equipped with a thermostated bath under a dry nitrogen atmosphere. A 1000 mL flask, equipped with a mechanical stirrer, was charged with 500 mL $CH_2Cl_2$ solution of poly(vinyl chloride) (1 wt % Geon 110×377 PVC), and was cooled to −70° C.

ATMS (allyltrimethylsilane) (0.1 mol/L) and Friedel-Crafts acid ($TiCl_4$ or $Et_2AlCl$, $4.5\times10^{-2}$ mol/L) were added, and the charge was stirred for 45 minutes. Methanol (about 20 mL) was added to terminate the reaction. The allylated poly(vinyl chloride) was precipitated with excess methanol, re-dissolved in THF, and centrifuged for 1 hour to remove metal oxide residues. The solvent was evaporated and the allylated poly(vinyl chloride) was dried in a vacuum oven at room temperature.

Epoxidation of Allylated PVC. Epoxidation of allylated poly(vinyl chloride) was carried out with excess m-chloroperbenzoic acid in 1,2-dichloroethane solution. Thus, a 500 mL flask equipped with a magnetic stir bar was charged with 250 mL of a 1,2-dichloroethane solution of allylated poly(vinyl chloride) (1.5 wt %) and m-chloroperbenzoic acid (0.75 g), and the charge was stirred for 4 hours at room temperature. The product was precipitated with methanol, washed sequentially with 5% aqueous sodium bicarbonate, distilled water and methanol, and dried in a vacuum oven at room temperature.

Characterization. $^1H$ and $^{13}C$ NMR spectra were recorded by a Varian 300 spectrometer.

Allylations were carried out by the use of $TiCl_4$ and $Et_2AlCl$ in $CH_2Cl_2$ at −70° C. FIG. 1 shows the $^1H$ NMR spectrum, together with the assignments, of a representative allylated poly(vinyl chloride) obtained with $TiCl_4$. Integrating and correlating the characteristic resonances of the allyl function (i.e., the terminal protons in the $-CH_2CH=CH_2$ group) in the 5.65 to 5.95 ppm range, with the resonances at about 4.5 ppm (associated with the $-CH_2CH(Cl)-$ group), gives the amount of cationically active chlorine content. Representative results are shown in TABLE II.

TABLE II

Cationically active chlorine content determined by allylation*:

| Friedel-Crafts acids | Number of allyl group after allylation per PVC chains | Active chlorines per PVC chain | Active chlorines mole % |
|---|---|---|---|
| $TiCl_4$ | 3.3 | 1.8 | 0.31 |
| $Et_2AlCl$ | 3.1 | 1.6 | 0.27 |

*Allyl chlorine content of virgin PVC: 1.5 per PVC chain (by NMR)

The second column in TABLE II specifies the total number of allyl groups in our poly(vinyl chloride) after allylation. The third column shows active chlorines per poly(vinyl chloride) chain (i.e. the difference between the number of allyl groups in allylated and virgin poly(vinyl chloride)). The fourth column gives the cationically active chlorines in mol % obtained by dividing the value in the third column with 585 (i.e., the number average degree of polymerization of the poly(vinyl chloride) used). According to these results, the reaction between the carborcationic species and ATMS is essentially quantitative.

In accordance with the patent statutes, the best mode and preferred embodiment have been set forth, and the scope of the present invention is not limited thereto, but rather by the scope of the attached claims.

What is claimed is:

1. A poly(vinyl chloride) composition comprising:
a poly(vinyl chloride) having at least

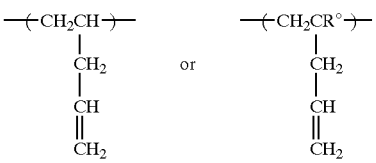

one
repeat unit per polymer chain, wherein R° is a poly(vinyl chloride) branch chain.

2. The poly(vinyl chloride) composition according to claim 1, wherein the allyl group of said repeat unit has replaced a labile chlorine group on said poly(vinyl chloride).

3. The poly(vinyl chloride) composition according to claim 1, wherein said poly(vinyl chloride) is a homopolymer of vinyl chloride or chlorinated poly(vinyl chloride), or a copolymer derived from a vinyl chloride monomer and at least one comonomer, or a blend of a poly(vinyl chloride) and chlorinated poly(vinyl chloride).

4. The poly(vinyl chloride) composition according to claim 3, wherein said comonomer is present in a range from about 0.01 to about 20 parts by weight based upon the total weight of said comonomer and said vinyl chloride monomer.

5. The poly(vinyl chloride) composition according to claim 1, wherein the allyl group is derived from an allyltrialkylsilane.

6. The poly(vinyl chloride) composition according to claim 5, wherein said repeat units are present in said poly(vinyl chloride) in an average amount from about 1.0 to about 3.0 repeat units per polymer chain.

7. The poly(vinyl chloride) composition according to claim 6, wherein the number average degree of polymerization of said poly(vinyl chloride) is from about 100 to about 1,500.

8. A poly(vinyl chloride) composition comprising:

the reaction product of a poly(vinyl chloride) and an allyltrialkylsilane having the formula:

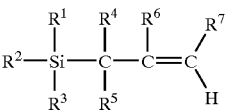

wherein $R^1$, $R^2$, and $R^3$, independently, is an alkyl (linear or branched) having 1 to about 5 carbon atoms, wherein $R^4$, $R^5$, $R^6$, and $R^7$, independently, can be a hydrogen atom, an alkyl (linear or branched) having from 1 to 10 carbon atoms.

9. The poly(vinyl chloride) composition according to claim 8, wherein $R^1$, $R^2$, and $R^3$ are methyl groups, and wherein $R^4$, $R^5$, $R^6$, and $R^7$ are hydrogen atoms.

10. A poly(vinyl chloride) polymer or copolymer chain having at least one allylic functional group directly pendant from said chain, said allylic functional group having the formula ($-CH_2-CH=CH_2$).

* * * * *